United States Patent
Kato

(10) Patent No.: US 9,896,101 B2
(45) Date of Patent: Feb. 20, 2018

(54) AUTONOMOUS DRIVING VEHICLE SYSTEM

(71) Applicant: TOYOTA JIDOSHA KABUSHIKI KAISHA, Toyota-shi, Aichi (JP)

(72) Inventor: Akira Kato, Shizuoka (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/134,772

(22) Filed: Apr. 21, 2016

(65) Prior Publication Data

US 2016/0311431 A1 Oct. 27, 2016

(30) Foreign Application Priority Data

Apr. 27, 2015 (JP) ................................. 2015-090400

(51) Int. Cl.
- *B60W 30/165* (2012.01)
- *B62D 1/28* (2006.01)
- *G01C 21/36* (2006.01)
- *G05D 1/00* (2006.01)

(52) U.S. Cl.
CPC ............. *B60W 30/165* (2013.01); *B62D 1/28* (2013.01); *G01C 21/3617* (2013.01); *G05D 1/0088* (2013.01); *G05D 2201/0213* (2013.01)

(58) Field of Classification Search
None
See application file for complete search history.

(56) References Cited

U.S. PATENT DOCUMENTS

| 8,170,739 B2 | 5/2012 | Lee |
| 9,227,635 B1 | 1/2016 | Takamatsu et al. |
| 2009/0222170 A1 | 9/2009 | Scherl et al. |
| 2010/0004821 A1 | 1/2010 | Buerkle et al. |

(Continued)

FOREIGN PATENT DOCUMENTS

| EP | 2495156 A1 | 9/2012 |
| JP | H07-192194 A | 7/1995 |

(Continued)

OTHER PUBLICATIONS

U.S. Appl. No. 15/138,845, filed Apr. 26, 2016.

(Continued)

*Primary Examiner* — Jonathan M Dager
*Assistant Examiner* — Garrett F Evans
(74) *Attorney, Agent, or Firm* — Andrews Kurth Kenyon LLP

(57) ABSTRACT

An autonomous driving vehicle system includes a travel plan generation unit configured to generate a travel plan and a control width of a target control value, a travel control unit configured to calculate an instruction control value, and a behavior determination unit configured to determine whether or not a behavior change which is opposite to the most recent behavior change is performed. In a case where it is determined that the opposite behavior change is performed, the travel control unit is configured to calculate the instruction control value such that a behavior change amount of the most recent behavior change is smaller and becomes in the restricted vehicle state corresponding to the state within the control width compared to the case where the current vehicle state is caused to follow the target vehicle state when it is determined that the opposite behavior change is not performed.

8 Claims, 10 Drawing Sheets

(56) References Cited

U.S. PATENT DOCUMENTS

| | | |
|---|---|---|
| 2010/0228420 A1 | 9/2010 | Lee |
| 2012/0323473 A1 | 12/2012 | Irie et al. |
| 2013/0197758 A1 | 8/2013 | Ueda et al. |
| 2015/0025731 A1 | 1/2015 | Uehara |

FOREIGN PATENT DOCUMENTS

| | | |
|---|---|---|
| JP | 2008-180591 A | 8/2008 |
| JP | 2009-129230 A | 6/2009 |
| WO | 2012/068331 A1 | 5/2012 |
| WO | 2014148025 A1 | 9/2014 |

OTHER PUBLICATIONS

US Patent and Trademark Office, Final Office Action in U.S. Appl. No. 15/138,845 dated Jul. 7, 2017, 8 pages.

US Patent and Trademark Office, Non-Final Office Action in U.S. Appl. No. 15/138,845 dated Jan. 11, 2017, 14 pages.

US Patent and Trademark Office, Notice of Allowance in U.S. Appl. No. 15/138,845 dated Oct. 25, 2017, 14 pages.

AUTONOMOUS DRIVING VEHICLE SYSTEM

CROSS-REFERENCE TO RELATED APPLICATION

The present application claims priority to Japanese Patent Application No. 2015-090400 filed on Apr. 27, 2015, which is incorporated herein by reference in its entirety.

TECHNICAL FIELD

The present invention relates to an autonomous driving vehicle system.

BACKGROUND

For example, as disclosed in US Patent Application Publication No. 2010/0228420, an autonomous driving vehicle system that controls a travelling of a vehicle is disclosed.

The autonomous driving vehicle system like this generates a travel plan including a trajectory on which the vehicle travels based on a positional relationship between the host vehicle and another vehicle around the host vehicle, and controls the travelling of the vehicle based on the generated travel plan.

SUMMARY

Incidentally, there is a case where the autonomous driving vehicle system controls the travelling of the host vehicle such that it moves in an opposite way such as causing the host vehicle to decelerate after an acceleration or causing the host vehicle to turn left after a right turning according to the positional relationship between the host vehicle and the other vehicle around the host vehicle. In this case, since the change of the behavior is large when the host vehicle moves in the opposite way, a riding comfort in the vehicle may be considered to deteriorate. Therefore, it is desirable to suppress the deterioration of the riding comfort in the vehicle even in case where the host vehicle moves in the opposite way.

Therefore, an object of an embodiment of the present invention is to provide an autonomous driving vehicle system in which, in a case where it is determined that a behavior of a vehicle which is a behavior change that is opposite to the most recent behavior change is performed, a driving comfort of the vehicle can be improved compared with that in a case where the travelling of the vehicle is controlled by following a target control value in the travel plan.

An autonomous driving vehicle system according to an embodiment of the present invention includes: a surrounding information recognition unit configured to recognize surrounding information of a vehicle; a travel plan generation unit configured to generate a travel plan along a pre-set target route based on the surrounding information of the vehicle and generate a control width of a target control value of the vehicle in the travel plan; and a vehicle state recognition unit configured to recognize a vehicle state. A calculation unit is provided configured to calculate an instruction control value such that the vehicle state becomes a target vehicle state corresponding to the target control value based on the travel plan, the control width, and the vehicle state. An actuator is provided configured to control the vehicle state based on the instruction control value, and a behavior determination unit is provided configured to determine whether or not a behavior change which is opposite to the most recent behavior change is performed within a first time interval from the current time with respect to the most recent behavior change of the vehicle occurs according to the travel plan. In a case where it is determined by the behavior determination unit that the opposite behavior change is performed, the calculation unit is configured to calculate the instruction control value such that a behavior change amount of the most recent behavior change is smaller and becomes to be in a restricted vehicle state corresponding to the state within the control width compared to the case where the current vehicle state is caused to follow the target vehicle state when it is determined that the opposite behavior change is not performed.

In a case where it is determined by the behavior determination unit that the opposite behavior change is performed (a case where the vehicle changes a behavior from an acceleration to a deceleration or the like), the autonomous driving vehicle system calculates the instruction control value such that the vehicle state becomes the restricted vehicle state. The restricted vehicle state is the vehicle state in which, in a case where the behavior determination unit determines that the opposite behavior change is not performed, the behavior change amount of the most recent behavior change is smaller and becomes to be in the vehicle state corresponding to the state within the control width compared to the case where the current vehicle state is caused to follow the target vehicle state. In this way, in the autonomous driving vehicle system, in a case where it is determined that the behavior of the vehicle which is the behavior change opposite to the most recent behavior change is performed, the behavior change can be smaller compared to the case where the travelling of the vehicle is controlled to follow the target control value in the travel plan. Therefore, it is possible to improve the riding comfort in the vehicle.

The travel plan generation unit may be configured to generate the travel plan of the first time, and the behavior determination unit may be configured to determine whether or not the opposite behavior change is performed in the travel plan for the first time. In this case, the behavior determination unit can determine whether or not the opposite behavior change is performed within the first time using the travel plan for the first time generated by the travel plan generation unit.

In a case where it is determined by the behavior determination unit that the opposite behavior change is performed, the calculation unit may be configured to calculate the instruction control value such that the vehicle state becomes the restricted vehicle state until the vehicle reaches a timing in the travel plan at which the opposite behavior change is performed. In this way, the autonomous driving vehicle system can end the calculating of the instruction control value which is an exceptional restricted vehicle state at an appropriate timing. Therefore, it is possible to calculate the instruction control value again such that the vehicle state becomes the target vehicle state.

In a case where it is determined by the behavior determination unit that the opposite behavior change is performed, the calculation unit may be configured to calculate the instruction control value such that the vehicle state becomes the restricted vehicle state until the vehicle state coincides with the target vehicle state after the vehicle reaches the timing in the travel plan at which the opposite behavior change is performed. In this way, the autonomous driving vehicle system can end the calculating of the instruction control value which is an exceptional restricted vehicle state at an appropriate timing Therefore, it is possible to calculate the instruction control value again such that the vehicle state becomes the target vehicle state.

The autonomous driving vehicle system further includes a stop detection unit configured to detect whether or not there is a stop position on the target route of the vehicle within a predetermined distance from the vehicle. The travel plan generation unit may be configured to generate the travel plan for a plan generation time shorter than the first time, the behavior determination unit may be configured to determine whether or not the vehicle is in an acceleration state or a deceleration state based on the travel plan for the plan generation time, and in a case where it is determined that the vehicle is in the acceleration state and is not in the deceleration state within the plan generation time and in a case where the stop position is detected by the stop detection unit, the behavior determination unit is configured to determine that the opposite behavior change is performed, and in a case where it is determined by the behavior determination unit that the opposite behavior change is performed, the calculation unit may be configured to calculate the instruction control value relating to a speed of the vehicle such that the vehicle state becomes the restricted vehicle state. As above, even though the behavior which is the behavior change opposite to the most recent behavior change is not included in the travel plan for the plan generation time, the autonomous driving vehicle system calculates the instruction control value relating to the speed of the vehicle such that the speed of the vehicle becomes the restricted vehicle state. In this way, in the autonomous driving vehicle system, the behavior change can be smaller compared to the case where the travelling of the vehicle is controlled to follow the target control value in the travel plan. Therefore, it is possible to improve the riding comfort in the vehicle.

The stop detection unit may be configured to determine whether or not a traffic signal is a red signal when the vehicle arrives at a position of the traffic signal based on the display pattern of the traffic signal positioned within a predetermined distance from the vehicle on the target route, the speed of the vehicle, and the distance from the vehicle to the traffic signal, and in a case where it is determined that the traffic signal is the red signal, the stop detection unit is configured to determine that there is the stop position within the predetermined distance. In this case, the stop detection unit can detect the stop position while considering the timing of changing the signal indicated by the traffic signal.

In a case where it is determined by the behavior determination unit that the opposite behavior change is performed, the calculation unit may be configured to calculate the instruction control value such that the vehicle state becomes the restricted vehicle state until the travel plan that includes the change of the vehicle state to the deceleration state is newly generated by the travel plan generation unit. In this way, the autonomous driving vehicle system can end the calculating of the instruction control value which is an exceptional restricted vehicle state at an appropriate timing. Therefore, it is possible to calculate the instruction control value again such that the vehicle state becomes the target vehicle state.

The travel plan generation unit may be configured to generate the control width based on at least any of the vehicle state and the surrounding information. In this case, the autonomous driving vehicle system can perform the generation of an appropriate control width considering any of the vehicle state and the surrounding information rather than a constant value.

According to an embodiment of the present invention, in a case where it is determined that the behavior of the vehicle which is the behavior change opposite to the most recent behavior change is performed, it is possible to improve the riding comfort in the vehicle compared to the case where the travelling of the vehicle is controlled to follow the target control value in the travel plan.

DETAILED DESCRIPTION

Hereinafter, embodiments of the present invention will be described in detail with reference to the drawings. In the description, the same reference signs will be given to the same or corresponding elements, and the description thereof will not be repeated.

First Embodiment

Figure 1:
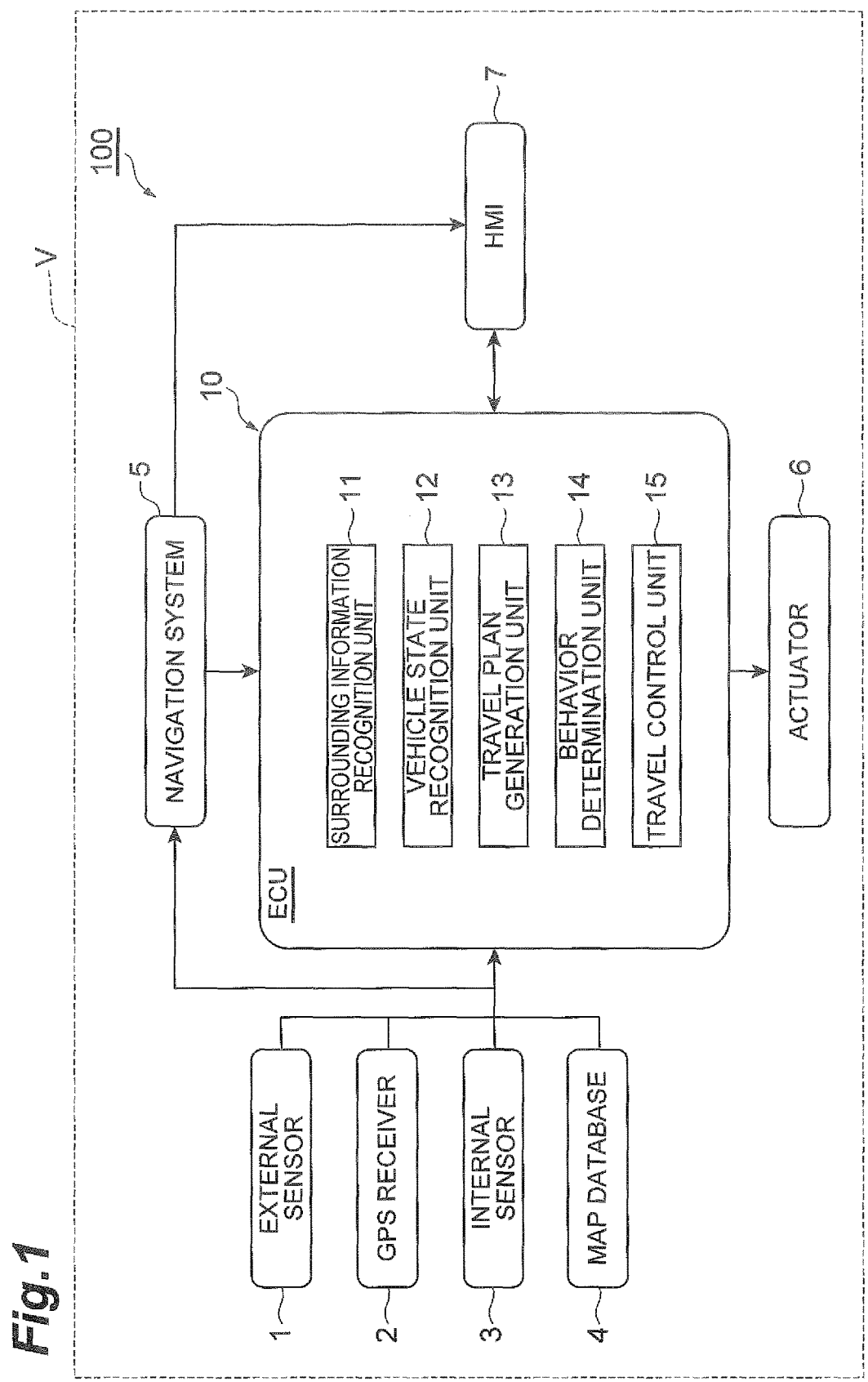
FIG. 1 is a block diagram illustrating a configuration of an autonomous driving vehicle system in a first embodiment.

FIG. 1 is a block diagram illustrating a configuration of an autonomous driving vehicle system 100 in a first embodiment. As illustrated in FIG. 1, an autonomous driving vehicle system 100 is mounted on a vehicle V such as a passenger car or the like. The autonomous driving vehicle system 100 includes an external sensor 1, a global positioning system (GPS) receiver 2, an internal sensor 3, a map database 4, a navigation system 5, an actuator 6, an electronic control unit (ECU) 10 and a human machine interface (HMI) 7.

The external sensor 1 is a detection device configured to detect information on the surroundings of the vehicle V. The external sensor 1 includes at least one of a camera, radar, and laser imaging detection and ranging (LIDAR).

The camera is an imaging device for imaging surroundings of the vehicle V. The camera is, for example, provided on the inside of windshield of the vehicle V. The camera transmits the imaging information to the ECU 10. The camera may be a monocular camera or may be a stereo camera. The stereo camera includes two imaging units that are arranged so as to reproduce a binocular parallax. The imaging information of the stereo camera also includes information on the depth direction.

The radar detects an obstacle outside of the vehicle V using a radio wave (for example, a millimeter wave). The radar detects the obstacle by transmitting the radio wave to the surroundings of the vehicle V and receiving the wave reflected from the obstacle. The radar transmits the detected obstacle information to the ECU 10.

The LIDAR detects the obstacle outside the vehicle V using light. The LIDAR transmits the light to the surroundings of the vehicle V, measures the distance to the reflection point by receiving the light reflected from the obstacle, and then, detects the obstacle. The LIDAR transmits the detected obstacle information to the ECU 10. The camera, the LIDAR, and the radar are not necessarily provided in an overlapping manner.

The GPS receiver 2 measures a position (for example, the latitude and the longitude of the vehicle V) of the vehicle V by receiving signals from three or more GPS satellites. The GPS receiver 2 transmits the measured position information of the vehicle V to the ECU 10. Instead of the GPS receiver 2, another means for specifying the latitude and the longitude at which the vehicle V is present may be used. In addition, in order to match the measuring result by the sensor with map information described below, it is preferable to provide a function for measuring the orientation of the vehicle V.

The internal sensor 3 is a detection device configured to detect a travelling state of the vehicle V. The internal sensor 3 includes at least one of a vehicle speed sensor, an acceleration sensor, and a yaw rate sensor. The vehicle speed sensor is a detection device configured to detect the speed of the vehicle V. As the vehicle speed sensor, for example, a wheel speed sensor is used, which is provided on vehicle wheels of the vehicle V or a drive shaft and the like rotating integrally with vehicle wheels and detects a rotational speed of the vehicle wheels. The vehicle speed sensor transmits the detected vehicle speed information (vehicle wheel speed information) to the ECU 10.

The acceleration sensor is a detection device configured to detect an acceleration (acceleration and deceleration) of the vehicle V. The acceleration sensor includes, for example, a longitudinal acceleration sensor that detects acceleration in the longitudinal direction of the vehicle V and a lateral acceleration sensor that detects a lateral acceleration of the vehicle V. The acceleration sensor transmits acceleration information of the vehicle V to the ECU 10. The yaw rate sensor is a detection device of the vehicle V configured to detect a yaw around the vertical axis of the center of gravity of the vehicle V (rotational angular velocity). As the yaw rate sensor, for example, a gyro sensor can be used. The yaw rate sensor transmits the detected yaw rate information of the vehicle V to the ECU 10.

The map database 4 is a database in which map information is included. The map database is formed, for example, in a hard disk drive (HDD) mounted on the vehicle V. In the map information, for example, position information of roads, information on road types (a type of a curve or a straight portion and a curvature of the curve), and position information of intersections, and branch points are included. Furthermore, in order to use position information of a shielding structure such as a building or a wall and simultaneous localization and mapping technology (SLAM), it is preferable for the map information to include an output signal of the external sensor 1. The map database may be stored in a computer in a facility such as an information processing center which is capable of communicating with the vehicle V.

The navigation system 5 is a device configured to perform guidance to a destination set by a driver of the vehicle V for a driver of the host vehicle V. The navigation system 5 calculates a travelling route of the host vehicle V based on the position information of the vehicle V measured by the GPS receiver 2 and the map information in the map database 4. The route may, for example, be a specified preferable lane in a multi-lane section. The navigation system 5 calculates, for example, a target route from the position of the vehicle V to the destination and performs notification to the driver by displaying the target route on a display or by a voice output from a speaker. The navigation system 5, for example, transmits the target route information of the vehicle V to the ECU 10. The navigation system 5 may be stored in a computer in a facility such as an information processing center which is capable of communicating with the vehicle V.

The actuator 6 is a device configured to control the vehicle state of the vehicle V. The actuator 6 includes at least a throttle actuator, a brake actuator, and a steering actuator. The throttle actuator controls a supply amount (throttle opening degree) of air to an engine according to an instruction control value from the ECU 10, and controls the driving power of the vehicle V. In a case where the vehicle V is a hybrid vehicle or an electric vehicle, the throttle actuator is not included and the driving power is controlled by the instruction control value from the ECU 10 being input to a motor which is a source of the driving force.

The brake actuator controls a brake system according to the instruction control value from the ECU 10 and controls the braking force given to the wheels of the vehicle V. For example, a hydraulic brake system can be used as the brake actuator. The steering actuator controls the driving of an assist motor that controls a steering torque in the electric power steering system according to the instruction control value from the ECU 10. In this way, the steering actuator controls the steering torque of the vehicle V.

The HMI 7 is an interface configured to perform an input and output of the information between the occupants (including the driver) of the vehicle V and the autonomous driving vehicle system 100. The HMI 7 includes, for example, a display panel for displaying the imaging information for the occupant, a speaker for audio output, and an operation button or a touch panel for the occupant to perform the input operation. When an input operation to start or stop the autonomous travelling is performed by the occupant, the HMI 7 starts or stops the autonomous travelling by outputting the signals to the ECU 10. When arriving at the destination where the autonomous driving ends, the HMI 7 notifies the occupants of the arrival at the destination. The HMI 7 may perform the outputting of the information to the occupants using a wirelessly connected mobile information terminal or may receive the input operation from the occupants using the mobile information terminal.

As illustrated in FIG. 1, the ECU 10 controls the autonomous driving of the host vehicle V. The ECU 10 is an electronic control unit including a central processing unit (CPU), read only memory (ROM), random access memory (RAM), and the like. In the ECU 10, various controls are performed by loading the program stored in the ROM into the RAM and executing the program by the CPU. The ECU 10 may be configured with a plurality of electronic control units.

Functionally, the ECU 10 includes a surrounding information recognition unit 11, a vehicle state recognition unit 12, a travel plan generation unit 13, a behavior determination unit 14, and a travel control unit (a calculation unit) 15.

The surrounding information recognition unit 11 recognizes surrounding information of the vehicle V based on the detection results of the external sensor 1 (for example, the imaging information of the camera, the obstacle information of the radar, or the obstacle information of the LIDAR). The surrounding information includes, for example, a position of a lane line of a travel lane or a position of a center of the lane with respect to the vehicle V or a width of the travel lane, a shape of a road (for example, a curvature of the travel lane, a gradient change in the road surface effective for estimation by the external sensor 1, an undulation, or the like), a situation of the obstacles (for example, surrounding vehicles) around the vehicle V (for example, information for distinguishing between a fixed obstacle and a moving obstacle, a position of the obstacle with respect to the vehicle V, a speed of the obstacle, a movement direction of the obstacle with respect to the vehicle V, a relative speed of the obstacle with respect to the vehicle V, and a size of the obstacle). In addition, it is preferable to compensate for the accuracy of the position and the direction of the vehicle V acquired by the GPS receiver 2 by matching the detection result of the external sensor 1 with the map information.

The vehicle state recognition unit 12 recognizes the vehicle state of the vehicle V. The position of the vehicle V (hereinafter, referred to as "vehicle position") and the travelling state of the vehicle V may be included in the vehicle state.

The vehicle state recognition unit 12 recognizes the vehicle position on the map based on the position information of the vehicle V received from the GPS receiver 2 and the map information in the map database 4. The vehicle state recognition unit 12 may acquire the vehicle position from the navigation system 5 and recognizes the vehicle position, which is used in the navigation system 5. In a case where the vehicle position of the vehicle V can be measured by the sensor installed outside on the road or the like, the vehicle state recognition unit 12 may acquire the vehicle position by a communication with the sensor.

The vehicle state recognition unit 12 recognizes the travelling state of the vehicle V based on the detection result of the internal sensor 3 (for example, the vehicle speed information from the vehicle sensor, the acceleration information from the acceleration sensor, the yaw rate information from the yaw rate sensor). For example, the speed, acceleration, yaw rate of the vehicle V are included in the travelling state of the vehicle V.

The travel plan generation unit 13 generates a target trajectory of the vehicle V based on the target route calculated by the navigation system 5, and the information of obstacles around the vehicle V recognized by the surrounding information recognition unit 11 (including a vehicle position and a direction of the surrounding vehicle). The target trajectory is a trajectory of the host vehicle V on the target route. The travel plan generation unit 13 generates the travel plan such that the host vehicle V can travel while satisfying standards such as safety, regulatory compliance, and driving efficiency on the target route. Here, it is needless to say that the travel plan generation unit 13 generates the target trajectory of the vehicle V so as to avoid a contact with obstacles based on the situation of the obstacles around the host vehicle V.

The target route described here also includes a travel route generated based on the surrounding information or the map information when a destination is not clearly set by a driver as a travel route along the road in the "driving assistance device" disclosed in Japanese Patent No. 5382218 (WO2011/158347) or the "driving assistance device" disclosed in Japanese Unexamined Patent Application Publication No. 2011-162132.

The travel plan generation unit 13 generates the travel plan according to the generated target trajectory. That is, the travel plan generation unit 13 generates the travel plan along the target route set based on the surrounding information of the vehicle V and the map information in the map database 4. The travel plan generation unit 13 may generate the travel plan without using the map information in the map database 4 such as in a case of determining the target trajectory based on the surrounding information of the vehicle V and generating the travel plan according to the determined target trajectory. The target control value which is a target for controlling the vehicle state of the vehicle V is included in the travel plan. It is preferable for the travel plan generation unit 13 to generate combinations of two elements of a target position p on a coordinate system fixed on the vehicle V and a target speed v at each target position as the target control value in the travel plan, that is, a plurality of configuration coordinates (p, v). Here, each target position p has at least information of the x and y coordinates on the coordinate system fixed on the vehicle V or information equivalent thereto. The target control value in the travel plan is not limited to be represented by the configuration coordinates described above. The travel plan may use a target time t, for example, instead of the target speed v in the configuration coordinates (p, v) described above. In addition, in a case of using the target time t instead of the target speed v in the configuration coordinates (p, v) described above, the target control value may further include an orientation of the vehicle V at the time point of the target time t.

Furthermore, a curve connecting the configuration coordinates may be approximated by a spline function or the like, and then, the parameters of the curve may be used as the travel plan. Any arbitrary known method can be used for the generation of the travel plan as long as the behavior of the vehicle V can be indicated.

The travel plan may further include a curvature of the target trajectory of the vehicle V at each target position, a target yaw angle of the vehicle V at each target position, and a target acceleration of the vehicle V at each target position as the target control value, in addition to the plurality of target positions through which the vehicle V passes along the target trajectory and the target speed at each target position.

In the present embodiment, the travel plan generation unit 13 generates the travel plan for a period of plan generation time (for example, several tens of seconds) from the current time. In addition, the plan generation time is a time set in advance. In addition, the travel plan generation unit 13 sequentially generates the travel plan in a predetermined generation cycle set in advance. For example, the travel plan generation unit 13 may generate the entire travel plan from the current position to the destination at once, or may generate a travel plan for the period of plan generation time.

The travel plan may be data that indicates trends of the target speed of the vehicle V, the target acceleration or deceleration, and a target steering torque when the vehicle V is travelling the target trajectory along the target route. The travel plan may include a pattern of the target speed of the vehicle V, a pattern of the target acceleration or deceleration, and a pattern of the target steering torque. Here, the travel plan generation unit 13 may generate the travel plan such that the travel time (a time required for the vehicle V to arrive at the destination) becomes shortest.

Incidentally, for example, the pattern of the target speed is data formed from a target vehicle speed set in association with the time for each target control position with respect to the target control position set on the target trajectory in a predetermined interval (for example, one meter). The pattern of the target acceleration or deceleration is, for example, data formed from the target acceleration or deceleration set in association with the time for each target control position with respect to the target control position set on the target trajectory in a predetermined interval (for example, one meter). The pattern of the target steering is, for example, data formed from the target steering set in association with the time for each target control position with respect to the target control position set on the target trajectory in a predetermined interval (for example, one meter).

The travel plan generation unit 13 further generates the control width of the target control value of the vehicle V in the travel plan in addition to the travel plan. The travel plan generation unit 13 generates the control width based on at least any of the surrounding information of the vehicle V recognized by the surrounding information recognition unit 11 and the vehicle state recognized by the vehicle state recognition unit 12. The control width is respectively set for each target control value in the travel plan. However, the travel plan generation unit 13 may not generate a control width corresponding to all types of the target control value in the travel plan. For example, in a case where the target position and the target speed are set as the target control values, the travel plan generation unit 13 may generate a control width with respect to only the target position. The travel plan generation unit 13 sequentially generates control width in a predetermined generation cycle set in advance, together with the travel plan.

In addition, a dimension (unit) of the control width is the same as that of the target control value of the vehicle V in the travel plan. That is, for example, the control width of the target position in a case where the target position is included in the target control value is the width of the position. For example, the control width of the target speed in a case where the target speed is included in the target control value is the width of the speed.

The control width generated by the travel plan generation unit 13 is a width of the target control value allowable in terms of the travel plan even if the vehicle state deviates from the target vehicle state. For example, the travel plan generation unit 13 may generate the control width while considering the riding comfort and the degree of safety of the vehicle. The generation of the control width while considering the riding comfort in the vehicle may be the generation of the width of target control value in which the vehicle V can be caused to travel in such a manner that the lateral acceleration occurring in the vehicle V becomes equal to or lower than a predetermined reference value set in advance. The generation of the control width while considering the safety of the vehicle may be the generation of the width of target control value in which the vehicle V can be caused to travel in such a manner that a vehicle-to-vehicle distance from the vehicle V to a surrounding vehicle becomes equal to or longer than a predetermined reference value set in advance.

Figure 2:
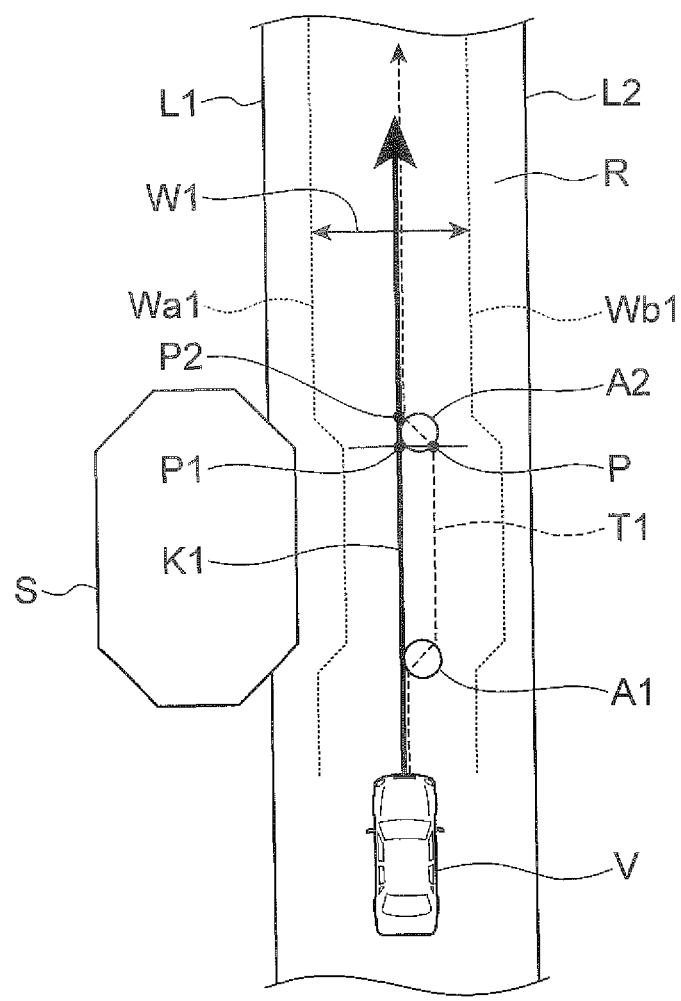
FIG. 2 is a plan view for explaining a setting of a target position and a control width of the target position.

Here, a specific example of the travel plan and the control width will be described. FIG. 2 is a plan view for explaining the setting of the target position and the control width of the target position in a case where the target position is included in the target control value in the travel plan. R illustrated in FIG. 2 is a travel lane on which the vehicle V travels. L1 and L2 illustrated in solid lines are lane lines which are boundaries between the travel lane R and adjacent lanes. T1 illustrated by a dashed line is a target trajectory connecting a plurality of target positions in the travel plan. W1 is a control width of the target position. The control width W1 is the direction normal to the target trajectory T1 and can be represented as a length between a control width boundary line Wa1 and a control width boundary line Wb1. The control width boundary line Wa1 illustrated by a dotted line is a curved line connecting the maximum values on the left side of the vehicle V in the control width generated for each target position. The control width boundary line Wb1 illustrated by a dotted line is a curved line connecting the maximum values on the right side of the vehicle V in the control width generated for each target position. In the example of FIG. 2, the control width W is a constant, but the control width W need not be a constant.

Figure 3:
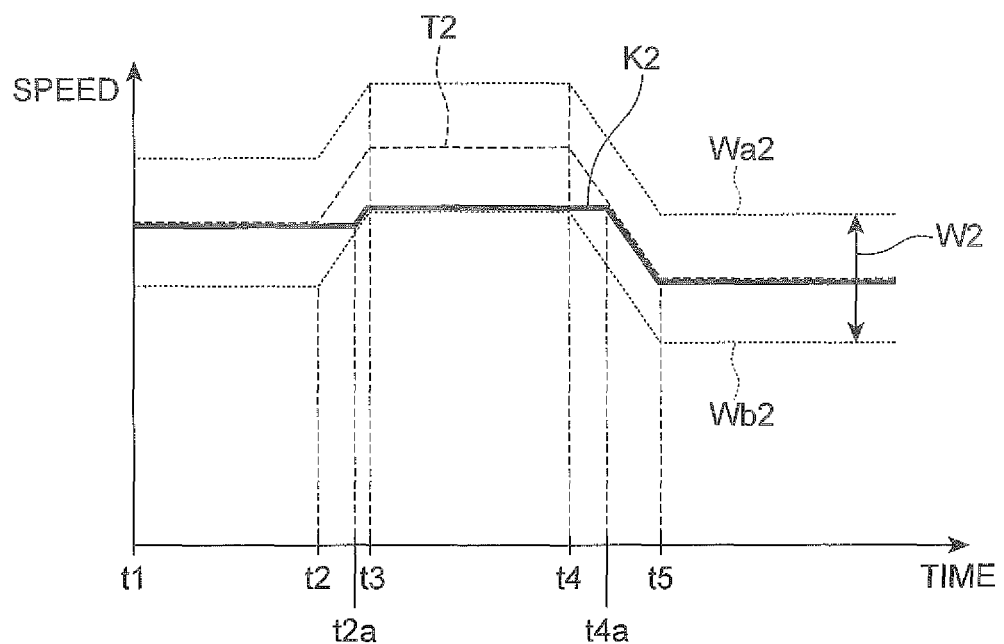
FIG. 3 is a diagram for explaining a setting of a target speed and a control width of the target speed.

FIG. 3 is a diagram for explaining the setting of the target speed and the control width of the target speed in a case where the target speed is included in the target control value in the travel plan. In FIG. 3, examples of the temporal changes of the target speed in the target control value and the temporal changes of the control width of the target speed are illustrated. T2 illustrated by a dashed line represents the temporal change of the target speed in the target control value. W2 illustrated by a dotted line represents a control width boundary line indicating the upper limit of the control width of the target speed. Wb2 illustrated by a dotted line represents a control width boundary line indicating the lower limit of the control width of the target speed. W2 is the control width of the target speed. The control width W2 can be represented as the speed between the control width boundary line Wa2 which is the upper limit of the control width and the control width boundary line Wb2 which is the lower limit of the control width.

Next, an example of setting the control width generated by the travel plan generation unit 13 will be described. For example, the travel plan generation unit 13 may generate the control width based on the width of the travel lane of the vehicle V which is the surrounding information. In this case, if the width of the travel lane is wide, the travel plan generation unit 13 may make the control width wider than that in a case where the width of the travel lane is narrow. The travel plan generation unit 13 may recognize the width of the travel lane by, for example, acquiring it from the surrounding information recognition unit 11. The travel plan generation unit 13 may generate the control width based on surrounding information other than the width of the travel lane.

The travel plan generation unit 13 may generate the control width based on, for example, the travelling state included in the vehicle state of the vehicle V. In this case, if the speed of the vehicle V which is the travelling state is high, the travel plan generation unit 13 may make the control width be narrower than that in a case where the speed of the vehicle V is low. The travel plan generation unit 13 may recognize the speed of the vehicle V, for example, by acquiring it from the vehicle state recognition unit 12. If the yaw rate of the vehicle V which is the travelling state is large, the travel plan generation unit 13 may make the control width narrower than that in a case where the yaw rate of the vehicle V is small. In this case, the travel plan generation unit 13 may recognize the yaw rate by acquiring it from the vehicle state recognition unit 12. If the longitudinal acceleration or the lateral acceleration of the vehicle V which is the travelling state is large, the travel plan generation unit 13 may make the control width narrower than that in a case where the longitudinal acceleration or the lateral acceleration of the vehicle V is small. In this case, the travel plan generation unit 13 may recognize the longitudinal acceleration or the lateral acceleration by acquiring it from the vehicle state recognition unit 12.

The behavior determination unit 14 determines whether or not a behavior change that is opposite to the most recent behavior change is performed within a first time from the current time with respect to the most recent behavior change of the vehicle V occurs according to the travel plan. In the present embodiment, the behavior determination unit 14 determines whether or not the vehicle V executes the behavior change opposite to the most recent behavior change of the vehicle V based on the behavior of the vehicle V included in the travel plan generated by the travel plan generation unit 13. In the present embodiment, the "first time" in determining whether or not the behavior change opposite to the most recent behavior change is performed within a first time from the current time is the same time as the plan generation time when the travel plan generation unit 13 generates the travel plan, or a time shorter than the plan generation time. In this way, the behavior determination unit 14 can determine whether or not the behavior change opposite to the most recent behavior change is performed based on the travel plan. The behavior determination unit 14 determines whether or not the behavior change of the vehicle V opposite to the most recent behavior change is performed within the first time from the current time within the travel plan of the first time for each generation of the travel plan by the travel plan generation unit 13. The first time in the present embodiment may be a predetermined time set in advance.

Specifically, as the behavior of the vehicle V which is the behavior change opposite to the most recent behavior change, the behavior determination unit 14 determines the change of an acceleration and deceleration behavior in which the acceleration and deceleration state is opposite to that of the most recent behavior, or a change of a steering behavior in which the steering direction of the vehicle V is opposite to that of the most recent behavior. The acceleration and deceleration behavior is the behavior of the vehicle V changing from the acceleration state to the deceleration state or the behavior of the vehicle V changing from the deceleration state to the acceleration state. The behavior determination unit 14 may determine the acceleration and deceleration behavior based on the target speed at each target position included in the travel plan. The steering behavior is the behavior of the vehicle V changing from the right steering angle state in which the vehicle V turns to the right to the left steering angle state in which the vehicle V turns to the left, or the behavior of the vehicle V changing from the left steering angle state in which the vehicle V turns to the left to the right steering angle state in which the vehicle V turns to the right. The behavior determination unit 14 may determine whether the vehicle V is in the right steering angle state or in the left steering angle state based on the change of the target trajectory (the turning direction of the target trajectory or the like).

When determining the acceleration and deceleration behavior, also in a case where a state of travelling at a constant speed is included in the time from the acceleration state to the deceleration state or in the time from the deceleration state to the acceleration state, the behavior determination unit 14 may determine the behavior as the acceleration and deceleration behavior in which the acceleration and deceleration state becomes opposite to that of the most recent behavior. In addition, when determining the steering angle behavior, also in a case where a straight travelling state (the state in which the steering angle becomes zero) in which the vehicle V is travelling straight is included in the time from the right steering angle state to the left steering angle state, or in a case where a straight travelling state is included in the time from the left steering angle state to the right steering angle state, the behavior determination unit 14 may determine the behavior as the steering angle behavior in which the steering angle direction becomes opposite to that of the most recent behavior.

The travel control unit 15 automatically controls the travelling of the vehicle V based on the travel plan and the control width generated from the travel plan generation unit 13. Specifically, the travel control unit 15 calculates the instruction control value such that the vehicle state of the vehicle V becomes the target vehicle state corresponding to the target control value in the travel plan based on the travel plan and the control width generated from the travel plan generation unit 13 and the vehicle state recognized by the vehicle state recognition unit 12. The travel control unit 15 outputs the calculated instruction control value to the actuator 6. In this way, the travel control unit 15 controls the travelling of the vehicle V such that the vehicle V autonomously travels according to the travel plan. The target vehicle state corresponding to the target control value is the target vehicle state of the vehicle V realized by the output of the actuator 6 according to the target control value in the travel plan.

More specifically, in a case where the current vehicle state is not the target vehicle state corresponding to the target control value in the travel plan, the travel control unit 15 causes the vehicle state to be close to the target vehicle state. As an example, the travel control unit 15 may switch the control of the travelling of the vehicle V based on whether or not the current vehicle state recognized by the vehicle state recognition unit 12 is the vehicle state corresponding to a state within the control width of the target control value. In this case, for example, in a case where the current vehicle state is the vehicle state corresponding to a state within the control width of the target control value, the travel control unit 15 may calculate the instruction control value such that the vehicle state becomes gradually closer to the target vehicle state than in a case where the current vehicle state is a vehicle state corresponding to a state outside the control width of the target control value.

In addition, in a case where it is determined by the behavior determination unit 14 that the behavior of the vehicle V executes the behavior change opposite to the most recent behavior change within the first time from the current time, the travel control unit 15 calculates the instruction control value such that the vehicle state becomes the restricted vehicle state. The restricted vehicle state is the vehicle state in which, in a case where it is determined that the opposite behavior change is not performed, a behavior change amount of the most recent behavior change is smaller compared to the case where the current vehicle state is caused to follow the target vehicle state. Furthermore, restricted vehicle state is a vehicle state corresponding to a state within the control width. In addition, in the restricted vehicle state, the behavior change amount when the current vehicle state is caused to follow the target vehicle state may be a minimum value (that is, zero).

The behavior change amount when the current vehicle state is caused to follow the target vehicle state is an amount of change of the speed or an amount of change of the steering angle needed for the current vehicle state to follow the restricted vehicle state. Specifically, the behavior change amount when the current vehicle state is caused to follow the target vehicle state is a speed difference between the current speed of the vehicle V and the speed when the current vehicle state is caused to follow the restricted vehicle state. In addition, the behavior change amount when the current vehicle state is caused to follow the target vehicle state is a steering angle difference between the current steering angle of the vehicle V and the steering angle when the vehicle state is caused to follow the restricted vehicle state.

The behavior change amount when the current vehicle state is caused to follow the target vehicle state is the change amount of the speed or the change amount of the steering angle needed for the current vehicle state to follow the target vehicle state. Specifically, the behavior change amount is the speed difference of the current speed of the vehicle V and the speed when the vehicle state follows the target vehicle state. In addition, the behavior change amount when the current vehicle state is caused to follow the target vehicle state is the steering angle difference of the current steering angle of the vehicle V and the steering angle when the vehicle state is caused to follow the target vehicle state.

Specifically, for example, under the assumption that the speed is controlled within the control width of the target speed, the restricted vehicle state is a vehicle state in which the change amount of the speed becomes smaller than that in a case where the speed of the vehicle V is caused to follow the target speed in the travel plan. Alternatively, for example, under the assumption that the vehicle position of the vehicle V is controlled within the control width of the target position, the restricted vehicle state is a vehicle state in which the change amount of the steering angle becomes smaller than that in a case where the vehicle V is caused to follow the target trajectory in the travel plan.

Here, the behavior of the vehicle V in a case where the instruction control value is calculated such that the vehicle state of the vehicle V becomes the restricted vehicle state will be described in detail using the drawing. Firstly, the change amount of the steering angle will be described. As illustrated in FIG. 2, it is assumed that an obstacle S is present at the left end of the travel lane R. It is assumed that currently the vehicle V straightly travels in the travel lane R along the target trajectory T1. The target trajectory T1 extends so as to avoid the obstacle S. That is, in a case where the vehicle V travels to follow the target trajectory T1, the vehicle V is in the right steering angle state at an area A1 and the vehicle V is in the left steering angle state at an area A2. K1 represents the trajectory of the vehicle V in a case where the control in the present embodiment is performed. When the travel plan having a target trajectory T1 is generated, the behavior determination unit 14 determines that there is a steering angle behavior having an opposite steering direction. The travel control unit 15 calculates the instruction control value such that the change amount of the steering angle with respect to the current steering angle (straightly travelling state) becomes smaller than that in a case where vehicle V is caused to follow the target trajectory T1. In the example illustrated in FIG. 2, the travel control unit 15 calculates the instruction control value such that the change amount of the steering angle becomes a minimum (change amount is zero). In this way, even when the target trajectory T1 turns to the right at the area A1, the vehicle V continues to straightly travel without following the target trajectory T1. In the example illustrated in FIG. 2, even when the vehicle V continues to straightly travel without following the target trajectory T1 at the area A1, the vehicle position is within the control width W1 of the target position.

Next, the change amount of the speed will be described using FIG. 3. In the example illustrated in FIG. 3, the current time is assumed to be a time t1 The target speed T2 in the travel plan is in the acceleration state from a time t2 to a time t3 and in the deceleration state from a time t4 to a time t5 The current speed of the vehicle V (the speed at the time t1 ) is coincident with the target speed T2. K2 represents the change of the speed of the vehicle V in a case where the control in the present embodiment is performed. When the travel plan having the target speed T2 is generated like this, the behavior determination unit 14 determines that there is the acceleration and deceleration behavior having an opposite acceleration and deceleration state. The travel control unit 15 calculates the instruction control value such that the change amount of the speed with respect to the current speed (the speed at the time t1 ) becomes smaller than that in a case where the speed of the vehicle V is caused to follow the target speed T2. In the example illustrated in FIG. 3, the travel control unit 15 calculates the instruction control value such that the change amount of the speed becomes a minimum value (change amount is zero). In this way, even when the target speed T2 becomes high at the time subsequent to the time t2, the speed of the vehicle V maintains the current speed (the speed at the time t1 ) without following the target speed T2. In addition, in a case where the current speed is maintained, the speed of the vehicle V becomes outside of the control width of the target speed W2 Therefore, the travel control unit 15 calculates the instruction control value such that the speed of the vehicle V is controlled within the control width of the target speed W2 and such that the change amount of the speed becomes smaller than that in a case where the speed of the vehicle V is caused to follow the target speed T2. In the example illustrated in FIG. 3, the travel control unit 15 calculates the instruction control value such that the change amount of the speed with respect to the current speed becomes a minimum value. In this way, the speed K2 of the vehicle V is coincident with the speed at the control width boundary line Wb2 which is the lower limit of the control width of the control width W2 at the time subsequent to the time t2a.

Next, a condition for ending the processing of calculating the instruction control value such that the vehicle state of the vehicle V is the restricted vehicle state. Hereinafter, as an example of the ending conditions, a first example and a second example will be described. The first example and the second example of the ending conditions are set in the travel control unit 15 in advance.

First Example

As the first example of the ending condition, in a case where the behavior determination unit 14 determines that the behavior of the vehicle V which is the behavior change opposite to the most recent behavior change is performed within the first time from the current time, the travel control unit 15 calculates the instruction control value such that the vehicle state becomes the restricted vehicle state until the vehicle V reaches the timing in the travel plan at which the opposite behavior change is performed. Here, specifically, the timing in the travel plan at which the opposite behavior change is performed means the position in the travel plan at which the opposite behavior change is performed or the time in the travel plan at which the opposite behavior change is performed.

First, the case where the timing in the travel plan is the position in the travel plan will be described in detail. In a case where the behavior determination unit 14 determines that the behavior of the vehicle V which is the behavior change opposite to the most recent behavior change is performed within the first time from the current time, the travel control unit 15 calculates the instruction control value such that the vehicle state becomes the restricted vehicle state until the vehicle V arrives at the position in the travel plan at which the opposite behavior change is performed. Specifically, for example, in the example illustrated in FIG. 2, the travel control unit 15 ends the processing of calculating the instruction control value such that the vehicle state becomes the restricted vehicle state when the vehicle V arrives at the position where the target trajectory T1 changes to the left steering angle state after changing to the right steering angle state. Then, as described above, the travel control unit 15 calculates the instruction control value such that the vehicle position is to be on the target trajectory T1. Here, the time when the vehicle V arrives at the position where the target trajectory T1 changes to the right steering angle state may be the time when the vehicle V arrives at a point P1 which corresponds to a point P where the target trajectory T1 changes to the left steering angle state, for example, in the forward direction where the vehicle V actually travelling. For example, even in a case where the vehicle state such as the speed of the vehicle V other than the vehicle position described above using FIG. 2 is controlled to become the restricted vehicle state, similarly to the above, when the vehicle V arrives at the position where it is determined that the opposite behavior change is performed, the processing of calculating the instruction control value such that the vehicle state becomes the restricted vehicle state ends.

Here, for example, when determining whether or not the behavior of the vehicle V which is the behavior change opposite to the most recent behavior change is performed based on the travel plan, the behavior determination unit 14 can specify the position where the behavior of the vehicle V executes the opposite behavior change based on the target position included in the travel plan. The travel control unit 15 may determine whether or not the vehicle V arrives at the position where it is determined that the opposite behavior change is performed, for example, based on the vehicle position of the vehicle V recognized by the vehicle state recognition unit 12 and the position where the behavior of the vehicle V executes the opposite behavior change specified by the behavior determination unit 14.

Next, the case where the timing in the travel plan is the time in the travel plan will be described in detail. In a case where the behavior determination unit 14 determines that the behavior of the vehicle V which is the behavior change opposite to the most recent behavior change is performed within the first time from the current time, the travel control unit 15 calculates the instruction control value such that the vehicle state becomes the restricted vehicle state until the time in the travel plan elapses, during which the opposite behavior change is performed. Specifically, for example, in the example illustrated in FIG. 3, as the time in the travel plan at which the opposite behavior change is performed, the behavior determination unit 14 estimates a time window that is a time from the current time t1 to a time t4 at which the target speed T2 changes to the deceleration state after the change to the acceleration state. When the time window has elapsed from the current time t1, the travel control unit 15 ends the processing of calculating the instruction control value such that the vehicle state becomes the restricted vehicle state. Then, as described above, the travel control unit 15 calculates the instruction control value such that the speed of the vehicle V becomes the target speed T2. For example, even in a case where the vehicle state such as the vehicle position of the vehicle V other than the speed of the vehicle described above using FIG. 3 is controlled to become the restricted vehicle state, similarly to the above, the processing of calculating the instruction control value such that the vehicle state becomes the restricted vehicle state ends when the time window has elapsed.

Here, when determining whether or not the behavior of the vehicle V which is the behavior change opposite to the most recent behavior change is performed, the behavior determination unit 14 specifies the position where the behavior of the vehicle V executes the opposite behavior change based on the target position included in the travel plan. The travel control unit 15 may estimate the time window from the current time to the time when the vehicle V executes the behavior change based on the position specified by the behavior determination unit 14 and where the behavior of the vehicle V executes the opposite behavior change and the target speed included in the travel plan.

Second Example

As the second example of the ending condition, in a case where the behavior determination unit 14 determines that the behavior of the vehicle V which is the behavior change opposite to the most recent behavior change is performed within the first time from the current time, the travel control unit 15 calculates the instruction control value such that the vehicle state becomes the restricted vehicle state after the vehicle V reaches the timing in the travel plan at which the opposite behavior change is performed and until the vehicle state coincides with the target vehicle state. Here, specifically, the timing in the travel plan at which the opposite behavior change is performed means the position in the travel plan at which the opposite behavior change is performed or the time in the travel plan at which the opposite behavior change is performed.

First, the case where the timing in the travel plan is the position in the travel plan will be described in detail. In a case where the behavior determination unit 14 determines that the behavior of the vehicle V which is the behavior change opposite to the most recent behavior change is performed within the first time from the current time, the travel control unit 15 calculates the instruction control value such that the vehicle state becomes the restricted vehicle state after the vehicle V arrives at the position in the travel plan at which the opposite behavior change is performed and until the vehicle state coincides with the target vehicle state. Specifically, for example, in the example illustrated in FIG. 2, the travel control unit 15 ends the processing of calculating the instruction control value such that the vehicle state becomes the restricted vehicle state when the vehicle position (trajectory K1) of the vehicle V which continues to be in the straight forwarding state coincides with the target trajectory T1 after the vehicle V arrives at the position of changing to the right steering angle state. Then, as described above, the travel control unit 15 calculates the instruction control value such that the vehicle position is to be on the target trajectory T1.

Here, the time when the vehicle V arrives at the position where the target trajectory T1 changes to the right steering angle state may be the time when the vehicle V arrives at the point P1 which corresponds to the point P where the target trajectory T1 changes to the left steering angle state, for example, in the forwarding direction where the vehicle V is actually travelling In addition, in the example illustrated in FIG. 2, the vehicle position (trajectory K1) of the vehicle V which continues to be in the straight forwarding state coincides with the target trajectory T1 at the point P2 where the target trajectory T1 changes from the left steering angle state to the straight forwarding state. For example, even in a case where the vehicle state such as the speed of the vehicle V other than the vehicle position described above using FIG. 2 is controlled to become the restricted vehicle state, similarly to the above, when the vehicle state controlled to be the restricted vehicle state coincides with the target vehicle state, the processing of calculating the instruction control value such that the vehicle state becomes the restricted vehicle state ends.

Here, for example, when determining whether or not the behavior of the vehicle V which is the behavior change opposite to the most recent behavior change is performed based on the travel plan, the behavior determination unit 14 specifies the position where the behavior of the vehicle V executes the opposite behavior change based on the target position included in the travel plan. The travel control unit 15 may determine whether or not the vehicle V arrives at the position where it is determined that the opposite behavior change is performed, for example, based on the vehicle position of the vehicle V recognized by the vehicle state recognition unit 12 and the position where the behavior of the vehicle V executes the opposite behavior change specified by the behavior determination unit 14. In addition, the travel control unit 15 may determine whether or not the vehicle state controlled to be the restricted vehicle state coincides with the target vehicle state by comparing the vehicle state recognized by the vehicle state recognition unit 12 and the travel plan.

Next, the case where the timing in the travel plan is the time in the travel plan will be described in detail. In a case where the behavior determination unit 14 determines that the behavior of the vehicle V which is the behavior change opposite to the most recent behavior change is performed within the first time from the current time, the travel control unit 15 calculates the instruction control value such that the vehicle state becomes the restricted vehicle state after the time in the travel plan elapses, during which the opposite behavior change is performed and until the vehicle state coincides with the target vehicle state. Specifically, for example, in the example illustrated in FIG. 3, the behavior determination unit 14 estimates a time window that is a time from the current time t1 to a time t4 at which the target speed T2 changes to the deceleration state after the change to the acceleration state. The travel control unit 15 ends the processing of calculating the instruction control value such that the vehicle state becomes the restricted vehicle state when the speed K2 of the vehicle V of which the change amount is controlled to be small coincides with the target speed T2 (time point t4a) after the time window has elapsed (the time t4 has elapsed) from the current time t1. Then, as described above, the travel control unit 15 calculates the instruction control value such that the speed of the vehicle V becomes the target speed T2. For example, even in a case where the vehicle state such as the vehicle position of the vehicle V other than the speed of the vehicle described above using FIG. 3 is controlled to become the restricted vehicle state, similarly to the above, the processing of calculating the instruction control value such that the vehicle state becomes the restricted vehicle state ends when the vehicle state controlled to be the restricted vehicle state coincides with the target vehicle state.

Here, when determining whether or not the behavior of the vehicle V which is the behavior change opposite to the most recent behavior change is performed, the behavior determination unit 14 specifies the position where the behavior of the vehicle V executes the opposite behavior change based on the target position included in the travel plan. The travel control unit 15 may estimate the time window from the current time to the time when the vehicle V executes the behavior change based on the position specified by the behavior determination unit 14 and where the behavior of the vehicle V executes the opposite behavior change and the target speed included in the travel plan. In addition, the travel control unit 15 may determine whether or not the vehicle state controlled to be the restricted vehicle state coincides with the target vehicle state by comparing the vehicle state recognized by the vehicle state recognition unit 12 and the travel plan.

Figure 4:
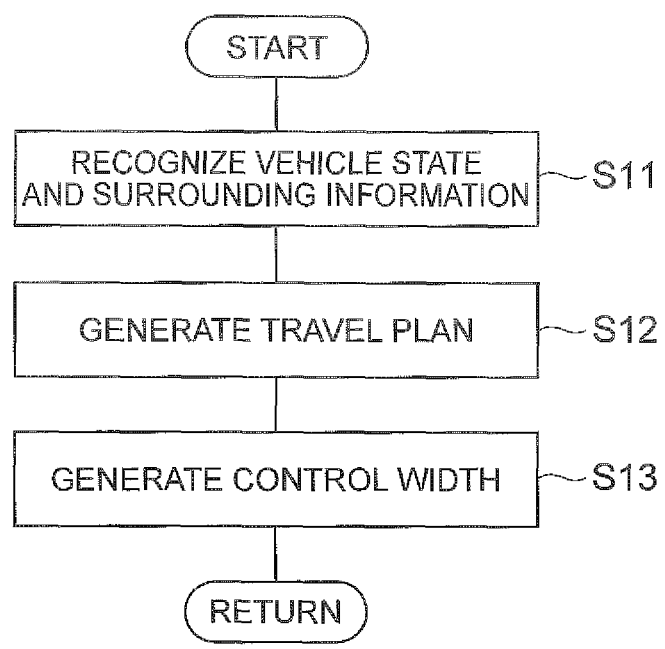
FIG. 4 is a flowchart illustrating a processing flow of generating the travel plan and the control width.

Next, a flow of the processing executed by the autonomous driving vehicle system 100 will be described. Firstly, the flow of the processing of generating the travel plan and the control width by the ECU 10 will be described in detail with reference to a flowchart in FIG. 4. For example, when the driver sets the destination in the navigation system 5 and performs the input operation on the HMI 7 to operate the autonomous travelling, the ECU 10 repeatedly executes the processing of generating the following travel plan and the control width in the predetermined generation period set in advance.

First, the vehicle state recognition unit 12 recognizes the vehicle state of the vehicle V. The surrounding information recognition unit 11 recognizes the surrounding information of the vehicle V (S11). The travel plan generation unit 13 generates the travel plan along the target route set in advance based on at least the surrounding information of the vehicle V and the map information in the map database 4 (S12). The travel plan generation unit 13 generates the control width based on at least any of the surrounding information of the vehicle V recognized by the surrounding information recognition unit 11 and the vehicle state recognized by the vehicle state recognition unit 12 (S13). The travel plan generation unit 13 outputs the generated travel plan and the control width to the travel control unit 15.

Next, a flow of the processing of controlling the travelling of the vehicle by the ECU 10 such that the vehicle state becomes the restricted vehicle state will be described in detail with reference to a flowchart in FIG. 5. This processing starts when the behavior determination unit 14 determines that the behavior of the vehicle V which is the behavior change opposite to the most recent behavior change is performed within the first time from the current time. In addition, the travelling state of the vehicle V is assumed to be within the control width of the travel plan. In a case where the behavior determination unit 14 determines that the behavior of the vehicle V which is the behavior change opposite to the most recent behavior change is not performed and in a case where the travelling state vehicle V is within the control width of the travel plan, the travel control unit 15, for example, as described above, may calculate the instruction control value such that the vehicle state becomes gradually close to the target vehicle state compared to the case where the vehicle state is a vehicle state corresponding to the outside of the control width. In addition, in a case where the travelling state of the vehicle V is outside the control width of the travel plan, the travel control unit 15, as described above, for example, may calculate the instruction control value such that vehicle state becomes closer to the target vehicle state at an earlier stage compared to the case where the current vehicle state is the vehicle state corresponding to the control width.

Figure 5:
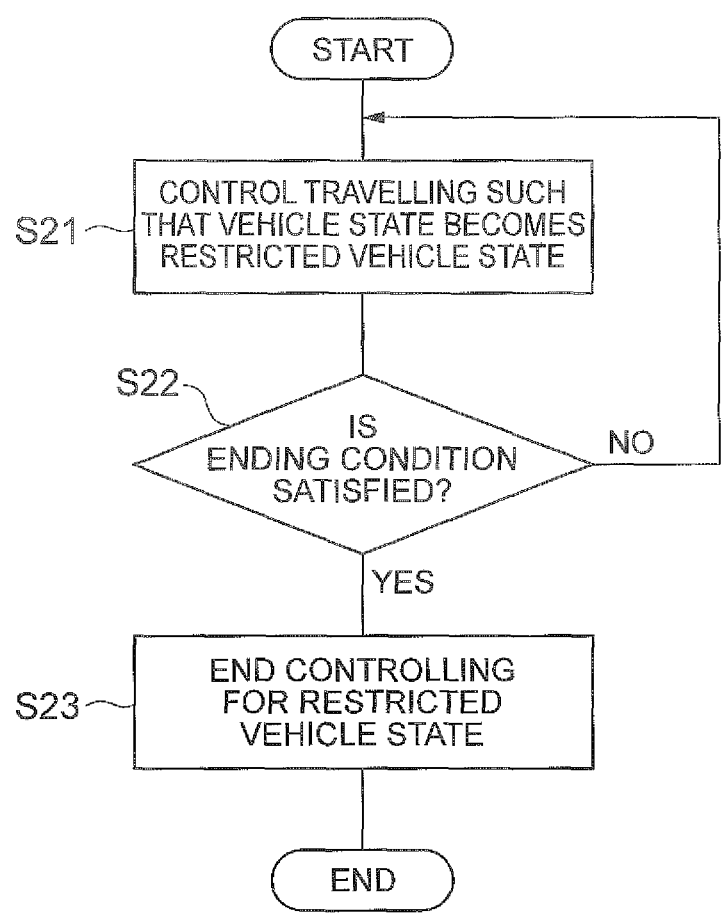
FIG. 5 is flowchart illustrating a processing flow of controlling a travelling of the vehicle such that a vehicle state becomes a restricted vehicle state.

As illustrated in FIG. 5, when the behavior determination unit 14 determines that the behavior of the vehicle V which is the behavior change opposite to the most recent behavior change is performed within the first time from the current time, the travel control unit 15 calculates the instruction control value such that the vehicle state of the vehicle V becomes the restricted vehicle state. Then, the travel control unit 15 outputs the calculated instruction control value to the actuator 6. As described above, the travel control unit 15 controls the travelling of the vehicle V such that the vehicle state of the vehicle V becomes the restricted vehicle state (S21).

Next, the travel control unit 15 determines whether or not to end the processing of calculating the instruction control value such that the vehicle state of the vehicle V becomes the restricted vehicle state (S22). Specifically, the condition for ending the processing such as the first example or the second example described above is set in the travel control unit 15 in advance. The travel control unit 15 determines whether or not the ending condition set in advance is satisfied. In a case where the ending condition set in advance is satisfied (YES in S22), the travel control unit 15 ends the processing of calculating the instruction control value such that the vehicle state of the vehicle V becomes the restricted vehicle state (S23). Then, the travel control unit 15, as described above, for example, may calculate the instruction control value such that the vehicle state of the vehicle V becomes gently close to the target vehicle state.

On the other hand, in a case where the ending condition set in advance is not satisfied (NO in S22), the travel control unit 15 performs the processing of calculating the instruction control value such that the vehicle state becomes the restricted vehicle state (S21).

As described above, in a case where the behavior determination unit 14 determines that the behavior of the vehicle V which is the behavior change opposite to the most recent behavior change is performed within the first time from the current time (such as a case in which the vehicle V decelerates after the acceleration), the autonomous driving vehicle system 100 in the present embodiment calculates the instruction control value such that the vehicle state becomes the restricted vehicle state. The restricted vehicle state is the vehicle state in which, in a case where the behavior determination unit 14 determines that the opposite behavior change is not executed, the behavior change amount of the most recent behavior change is smaller and becomes to be in the vehicle state corresponding to the state within the control width compared to the case where the current vehicle state is caused to follow the target vehicle state. In this way, in the autonomous driving vehicle system 100, in a case where it is determined that the behavior of the vehicle V which is the behavior change opposite to the most recent behavior change is performed, the behavior change can be smaller compared to the case where the travelling of the vehicle V is controlled to follow the target control value in the travel plan. Therefore, it is possible to improve the riding comfort in the vehicle V.

The travel plan generation unit 13 generates the travel plan of the first time, and the behavior determination unit 14 determines whether or not the behavior of the vehicle is performed opposite to the behavior change within the travel plan of the first time. In this case, the behavior determination unit 14 can determine whether or not the behavior of the vehicle is performed opposite to the behavior change within the first time using the travel plan of the first time generated by the travel plan generation unit 13.

As described in the first example of the ending condition, in a case where the behavior determination unit 14 determines that the behavior of the vehicle V which is the behavior change opposite to the most recent behavior change is performed within the first time from the current time, the travel control unit 15 may calculate the instruction control value such that the vehicle state becomes the restricted vehicle state until the vehicle V reaches the timing in the travel plan at which the opposite behavior change is performed. In this way, the autonomous driving vehicle system 100 can end the calculating of the instruction control value which is an exceptional restricted vehicle state at an appropriate timing, and thus, it is possible to calculate the instruction control value again such that the vehicle state becomes the target vehicle state.

As described in the second example of the ending condition, in a case where the behavior determination unit 14 determines that the behavior of the vehicle V which is the behavior change opposite to the most recent behavior change is performed within the first time from the current time, the travel control unit 15 may calculate the instruction control value such that the vehicle state becomes the restricted vehicle state until the vehicle state coincides with the target vehicle state after the vehicle V reaches the timing in the travel plan at which the opposite behavior change is performed. In this way, the autonomous driving vehicle system 100 can end the calculating of the instruction control value which is an exceptional restricted vehicle state at an appropriate timing. Therefore, it is possible to calculate the instruction control value again such that the vehicle state becomes the target vehicle state.

The travel plan generation unit 13 generates the control width based on at least any of the vehicle state and the surrounding information. In this case, the autonomous driving vehicle system 100 can perform the generation of, not a constant value, but an appropriate control width considering at least any of the vehicle state and the surrounding information.

Second Embodiment

Figure 6:
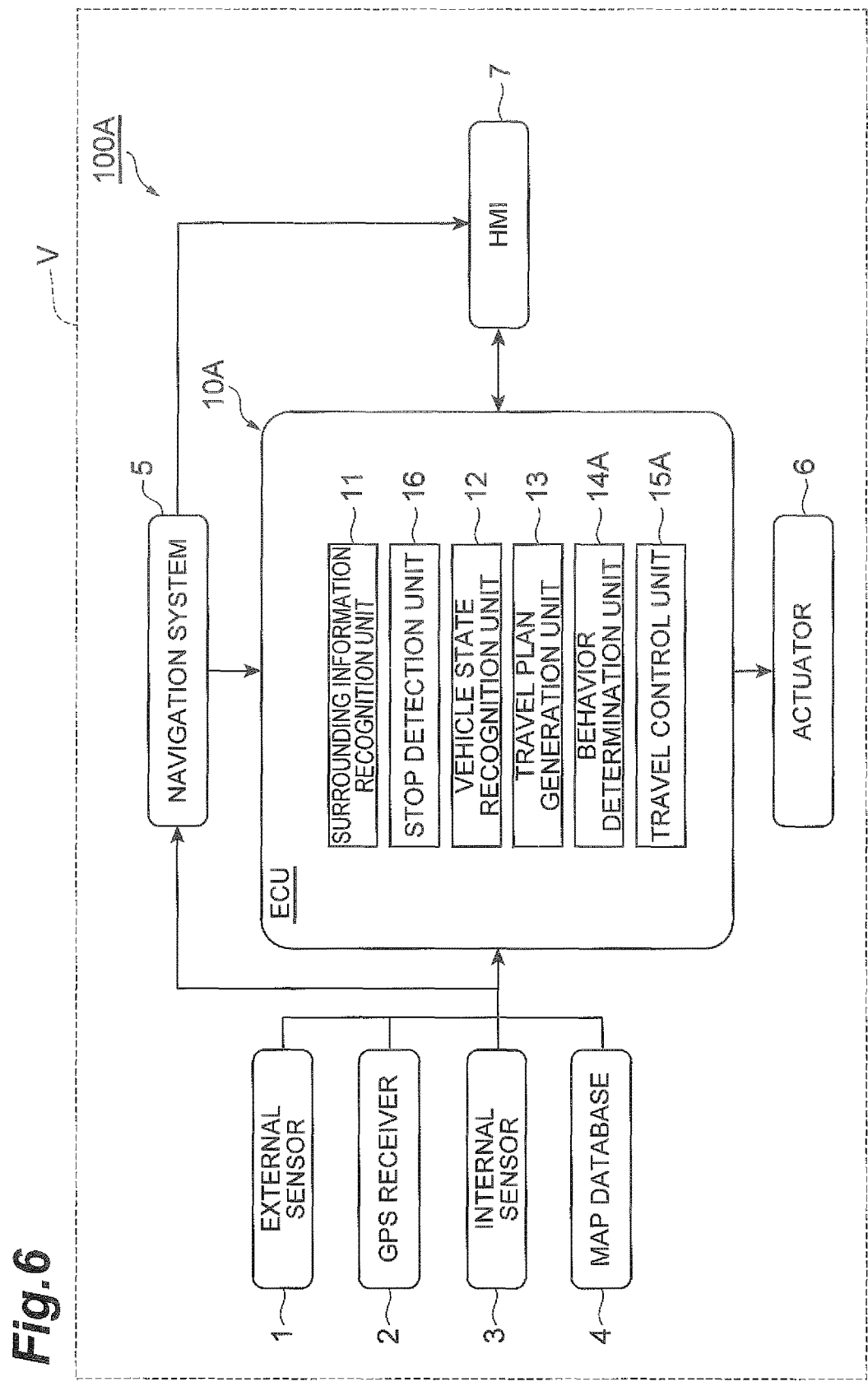
FIG. 6 is a block diagram illustrating a configuration of an autonomous driving vehicle system in a second embodiment.

Next, a second embodiment will be described. In the description of the present embodiment, points which are different from those in the first embodiment will be described in detail. The same reference signs will be given to elements which are the same as or correspond to those of the first embodiment, and the description thereof will not be repeated. FIG. 6 is a block diagram illustrating a configuration of an autonomous driving vehicle system 100A in the second embodiment. The autonomous driving vehicle system 100A includes the external sensor 1, the GPS receiver 2, the internal sensor 3, the map database 4, the navigation system 5, the actuator 6, the ECU 10A and the HMI 7.

The ECU 10A functionally includes the surrounding information recognition unit 11, the vehicle state recognition unit 12, the travel plan generation unit 13, a behavior determination unit 14A, a travel control unit (calculation unit) 15A, and a stop detection unit 16.

The stop detection unit 16 acquires, for example, the target route calculated by the navigation system 5. The stop detection unit 16 detects whether or not there is a stop position within a predetermined distance from the vehicle V on the acquired target route. In the target route, information regarding a path longer than a length of a path included in the target route is included. In the present embodiment, the "predetermined distance" in detecting whether or not there is a stop position within a predetermined distance from the vehicle V is a distance longer than the length of the path included in the travel plan. That is, the stop detection unit 16 detects a stop position which is not considered in the travel plan at the current time point and which is a stop position further preceding to the range planned by the travel plan.

For example, a red signal of a traffic signal (a traffic signal indicating a stop), a stop sign, a crosswalk on which a pedestrian is walking, and the like are stop positions. In a case where the external sensor 1 includes a camera, the stop detection unit 16 may detect the stop position by performing image processing based on the imaging information of the camera. In a case where information of the stop position (for example, a stop line) is included in the map information, the stop detection unit 16 may detect the stop position based on the map information.

Figure 7:
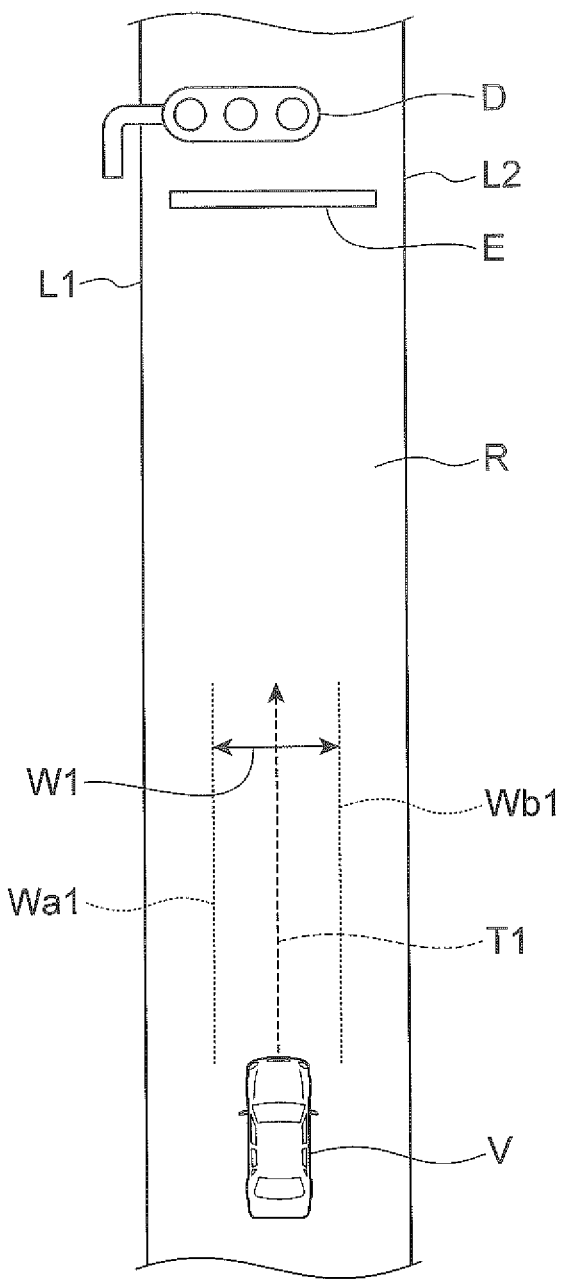
FIG. 7 is a plan view illustrating a positional relationship between a traffic signal and a vehicle.

Furthermore, as illustrated in FIG. 7, when the vehicle V arrives at the position of the traffic signal D on the target route, the stop detection unit 16 may detect the traffic signal D which is estimated to be a red signal as a stop position. In this case, the stop detection unit 16 may determine whether or not the traffic signal D is the red signal when the vehicle V arrives at the position of the traffic signal D based on a display pattern of the traffic signal D positioned at a predetermined distance from the vehicle V, the speed of the vehicle V, and the distance from the vehicle V to the traffic signal D. As the position of the traffic signal D, the stop detection unit 16 may detect a position directly below the traffic signal D or a position of the stop line E of the traffic signal D.

Specifically, the stop detection unit 16 determines whether or not the traffic signal D is the red signal when the vehicle V arrives at the position of the traffic signal D which is currently the red signal. The stop detection unit 16 detects an elapsed time for switching the traffic signal D from a green signal to the red signal as the display pattern. For example, in a case where the external sensor 1 includes a camera, the stop detection unit 16 may detect the elapsed time for switching the traffic signal D from the green signal to the red signal based on a change of the signal color detected by performing image processing based on imaging information of the camera. In addition, a time for switching the traffic signal D from the red signal to the green signal is stored in the stop detection unit 16 in advance. This switching time may be a general switching time in the traffic signal D. The stop detection unit 16 estimates a remaining time t1 for the traffic signal D to be switched to the green signal based on a timing of switching and the time for switching the traffic signal D from the red signal to the green signal.

The stop detection unit 16 calculates an arrival time t2 at which the vehicle V will arrive at the position of the traffic signal D. The arrival time t2 may be calculated based on the distance from the vehicle V to the traffic signal D and the speed of the vehicle V. For example, in a case where the external sensor 1 includes a stereo camera, the stop detection unit 16 may detect the distance from the vehicle V to the traffic signal D by performing image processing based on the imaging information of the stereo camera. For example, the stop detection unit 16 may use the current speed of the vehicle V as the speed of the vehicle V. Alternatively, the stop detection unit 16 may use a speed based on the target speed included in the travel plan as the speed of the vehicle V.

In a case where the remaining time t1 for the traffic signal D to be switched to the green signal is equal to or longer than the arrival time t2 at which the vehicle V will arrive at the position of the traffic signal D (that is, in a case where the traffic signal D is the red signal when the vehicle V arrives at the position of the traffic signal D), the stop detection unit 16 detects the traffic signal D as the stop position.

The behavior determination unit 14A determines whether or not the behavior of the vehicle V which is the behavior change opposite to the most recent behavior change is performed within the first time from the current time. The behavior determination unit 14A in the present embodiment determines whether or not the behavior of the vehicle V which is the behavior change opposite to the most recent behavior change is performed within the first time from the current time based on the travel plan and the result of detection by the stop detection unit 16. Specifically, firstly, the behavior determination unit 14A determines whether or not the vehicle is in the acceleration state and the deceleration state based on the target speed of the vehicle V included in the travel plan for the plan generation time generated by the travel plan generation unit 13. Next, the behavior determination unit 14A acquires the result of detecting the stop position by the stop detection unit 16.

In a case where it is determined that the vehicle V is in the acceleration state and is not changed to be in the deceleration state within the plan generation time, and in a case where the stop position is detected by the stop detection unit 16, the behavior determination unit 14A determines that the behavior of the vehicle V which is the behavior change opposite to the most recent behavior change is performed within the first time from the current time. In the present embodiment, differently from that in the first embodiment, the "first time" in determining whether or not the behavior of the vehicle V which is the behavior change opposite to the most recent behavior change is performed within the first time from the current time is a time for the vehicle V to arrive at the position separated by the above-described predetermined distance on the target route from the current position.

Furthermore, similar to the behavior determination unit 14 in the first embodiment, the behavior determination unit 14A determines the acceleration and deceleration behavior based on the travel plan as the behavior of the vehicle V which is the behavior change opposite to the most recent behavior change. In addition, the behavior determination unit 14A determines whether or not the behavior of the vehicle V which is the behavior change opposite to the most recent behavior change is performed within the first time from the current time for each generation of the travel plan by the travel plan generation unit 13.

Similar to the travel control unit 15 in the first embodiment, the travel control unit 15A automatically controls the travelling of the vehicle V based on the travel plan and the control width generated from the travel plan generation unit 13 and the result of detection by the behavior determination unit 14A. That is, in a case where the behavior determination unit 14A determines that the vehicle V is in the acceleration state within the plan generation time and is not changed to be in the deceleration state, and in a case where the stop position is detected by the stop detection unit 16, the travel control unit 15A calculates the instruction control value relating to the speed of the vehicle V such that the vehicle state of the vehicle V becomes the restricted vehicle state corresponding to the control width.

Next, a condition of ending the processing of calculating the instruction control value such that the speed of the vehicle V becomes the restricted vehicle state will be described. Firstly, the condition of ending the processing of calculating the instruction control value such that the vehicle state becomes the restricted vehicle state in a case where the stop position is detected will be described. In a case where the behavior determination unit 14A determines that the behavior of the vehicle V which is the behavior change opposite to the most recent behavior change is performed within the first time from the current time, the travel control unit 15A calculates the instruction control value such that the vehicle state becomes the restricted vehicle state until the travel plan is generated by the travel plan generation unit 13, which includes the change of the state of the vehicle V to the deceleration state.

Next, the condition of ending the processing of calculating the instruction control value such that the vehicle state becomes the restricted vehicle state in a case where it is determined that the vehicle V performs the acceleration and deceleration behavior based on the travel plan will be described. In this case, similar to the travel control unit 15 in the first embodiment, the travel control unit 15A ends the processing based on the first example or the second example of the ending condition set in advance in the travel control unit 15A.

Figure 8:
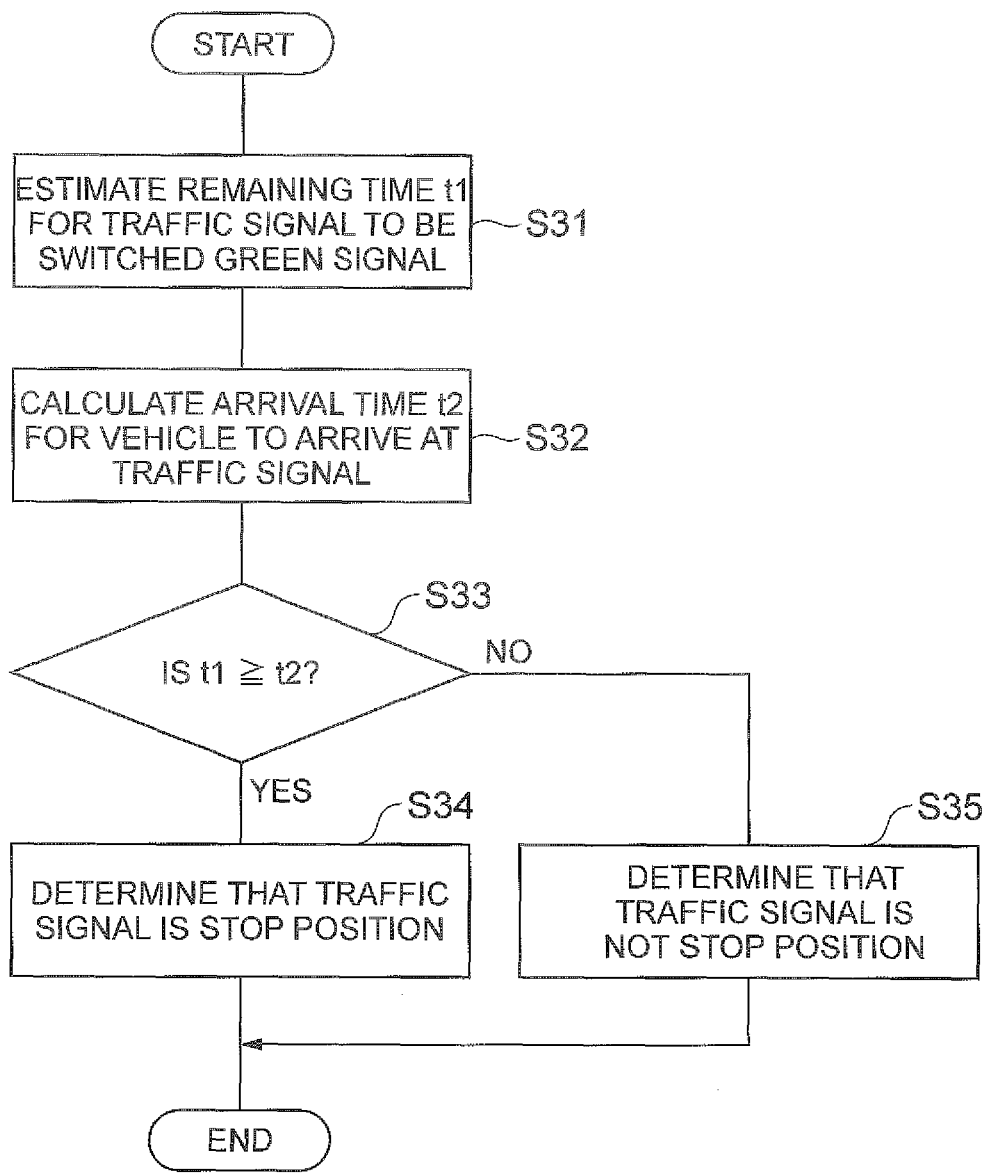
FIG. 8 is a flowchart illustrating a processing flow of estimating a red light of the traffic signal as a stop position.

Next, a processing flow by the stop detection unit 16 for determining the red light of the traffic signal D as the stop position will be described in detail with reference to a flowchart in FIG. 8. As illustrated in FIG. 8, the stop detection unit 16 estimates the remaining time t1 for the traffic signal D to be switched to the green signal (S31). The stop detection unit 16 calculates the arrival time t2 for the vehicle V to arrive at the position of the traffic signal D (S32). The stop detection unit 16 determines whether or not the remaining time t1 for the traffic signal D to be switched to the green signal is equal to or longer than the arrival time t2 for the vehicle V to arrive at the position of the traffic signal D (S33). In a case where the remaining time t1 is equal to or longer than the arrival time t2 (YES in S33), the stop detection unit 16 determines that the traffic signal D is the stop position (S34). On the other hand, in a case where the remaining time t1 is not equal to or longer than the arrival time t2 (NO in S33), the stop detection unit 16 does not determine that the traffic signal D is the stop position (S35).

Next, a processing flow by the ECU 10A for controlling the travelling of the vehicle V such that the speed of the vehicle V becomes the restricted vehicle state will be described in detail with reference to a flowchart in FIG. 9. In addition, the travelling state of the vehicle V is assumed to be within the control width in the travel plan. The processing to be described using the flowchart in FIG. 9 starts again for every generation of the travel plan by the travel plan generation unit 13.

In a case where the travelling state of the vehicle V is outside the control width in the travel plan, for example, as described above, the travel control unit 15A may calculate the instruction control value such that the vehicle state becomes close to the target vehicle state in the earlier stage compared to the case where the current vehicle state is the vehicle state corresponding to the control width.

Figure 9:
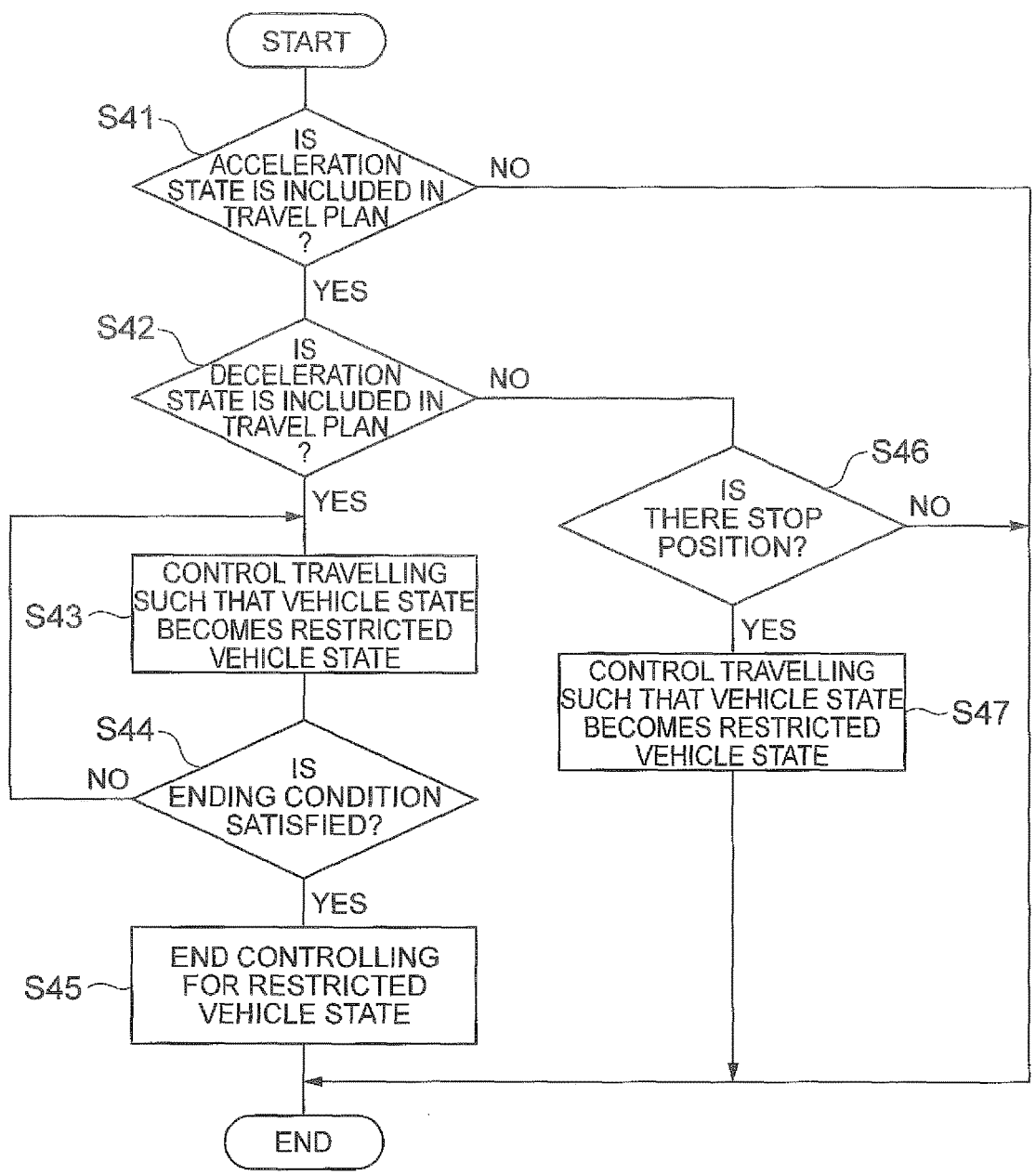
FIG. 9 is a flowchart illustrating a processing flow of controlling the travelling of the vehicle such that the vehicle state becomes the restricted vehicle state.

As illustrated in FIG. 9, the behavior determination unit 14A determines whether or not the behavior that makes the vehicle V be in the acceleration state is included in the travel plan based on the target speed of the vehicle V included in the travel plan generated by the travel plan generation unit 13 (S41). In a case where the behavior that makes the vehicle V be in the acceleration state is not included in the travel plan (NO in S41), the travel control unit 15A does not perform the processing of making the vehicle state be the restricted vehicle state. In this case, for example, the travel control unit 15A may calculate the instruction control value such that the vehicle state becomes gently close to the target vehicle state.

In a case where the behavior that makes the vehicle V be in the acceleration state is included in the travel plan (YES in S41), the behavior determination unit 14A determines whether or not the behavior that makes the vehicle V be in the deceleration state is included in the travel plan based on the target speed of the vehicle V included in the travel plan generated by the travel plan generation unit 13 (S42). In the processing in S42, the case where it is determined that the behavior causing the deceleration state to be included in the travel plan is the case where the behavior determination unit 14A determines that the vehicle V performs the acceleration and deceleration behavior.

In a case where the behavior that makes the vehicle V be in the deceleration state is included in the travel plan (YES in S42), the travel control unit 15A calculates the instruction control value such that the speed of the vehicle V becomes the restricted vehicle state. Then, the travel control unit 15A outputs the calculated instruction control value to the actuator 6. As described above, the travel control unit 15A controls the travelling of the vehicle V such that the speed of the vehicle V becomes the restricted vehicle state (S43).

Next, the travel control unit 15A determines whether or not to end the processing of calculating the instruction control value such that the speed of the vehicle V becomes the restricted vehicle state (S44). Specifically, as in the first example or the second example described above, the condition for ending the processing is set in advance in the travel control unit 15A. The travel control unit 15A determines whether or not the ending condition set in advance is satisfied. In a case where the ending condition set in advance is satisfied (YES in S44), the travel control unit 15A ends the processing of calculating the instruction control value such that the speed of the vehicle V becomes the restricted vehicle state (S45). Then, for example, as described above, the travel control unit 15A may calculate the instruction control value such that the vehicle state of the vehicle V becomes gently close to the target vehicle state.

On the other hand, in a case where the ending condition set in advance is not satisfied (NO in S44), the travel control unit 15A performs the calculation of the instruction control value such that the speed of the vehicle V becomes the restricted vehicle state (S43). As described above, the travel control unit 15A continues the processing of calculating the instruction control value such that the speed of the vehicle V becomes the restricted vehicle state until the ending condition is satisfied.

In addition, in a case where the behavior that makes the vehicle V be in the deceleration state is not included in the travel plan (NO in S42), the stop detection unit 16 detects whether or not there is a stop position within a predetermined distance from the vehicle V on the target route (S46). In a case where the stop position is detected (YES in S46), the travel control unit 15A calculates the instruction control value such that the speed of the vehicle V becomes the restricted vehicle state. Then, the travel control unit 15A outputs the calculated instruction control value to the actuator 6. As described above, the travel control unit 15A controls the travelling of the vehicle V such that the speed of the vehicle V becomes the restricted vehicle state (S47).

Figure 10:
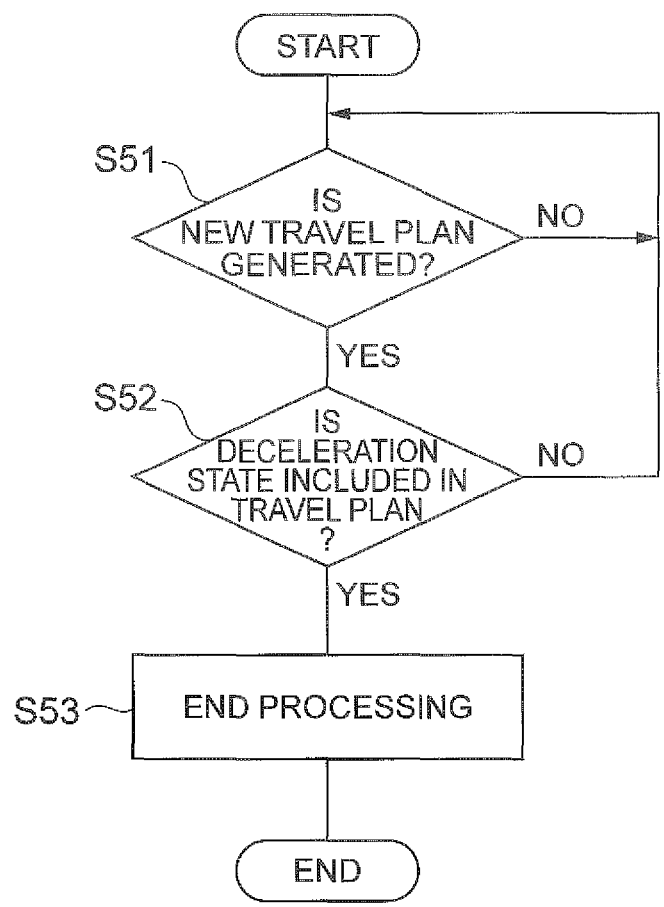
FIG. 10 is a flowchart illustrating a processing flow of ending the processing of controlling the travelling of the vehicle such that the vehicle state becomes the restricted vehicle state.

Next, a processing flow of ending the processing of controlling the travelling of the vehicle V such that the speed of the vehicle V becomes the restricted vehicle state performed by the travel control unit 15A in S47 in FIG. 9 will be described using a flowchart in FIG. 10. The processing illustrated in the flowchart in FIG. 10 starts when the processing S47 in FIG. 9 starts. The travel control unit 15A determines whether or not a new travel plan has been generated by the travel plan generation unit 13 (S51). In a case where a new travel plan has not been generated (NO in S51), the travel control unit 15A performs the processing S51 again. In a case where a new travel plan has been generated (YES in S51), the travel control unit 15A determines whether or not the newly generated travel plan is a travel plan that includes the change of the vehicle state of the vehicle V to the deceleration state (S52).

In a case where the newly generated travel plan is the travel plan that does not include the change of the state of the vehicle V to the deceleration state (NO in S52), the travel control unit 15A performs the processing of S51 again. In a case of a travel plan that includes the change of the state of the vehicle V to the deceleration state (YES in S52), the travel control unit 15A ends the processing (processing S47 in FIG. 9) of controlling the travelling of the vehicle V such that the speed of the vehicle V becomes the restricted vehicle state.

The processing S47 in FIG. 9 also ends in a case where the change of the state of the vehicle V to the acceleration state is not included in the travel plan newly generated by the travel plan generation unit 13 (NO in S41). In addition, the processing performed in S47 also ends in a case where the stop position is not detected by the stop detection unit 16 (NO in S46) when the new travel plan is generated by the travel plan generation unit 13.

As described above, in a case where it is determined by the behavior determination unit 14A that the vehicle is in the acceleration state and is not in the deceleration state within the plan generation time, and in a case where the stop position is detected by the stop detection unit 16, the travel control unit 15A in the present embodiment calculates the instruction control value relating to the speed of the vehicle such that the speed of the vehicle becomes the restricted vehicle state corresponding to the control width. As above, even if the behavior which is the behavior change opposite to the most recent behavior change is not included in the travel plan for the plan generation time, the autonomous driving vehicle system 100A calculates the instruction control value relating to the speed of the vehicle V such that the speed of the vehicle V becomes the restricted vehicle state. In this way, in the autonomous driving vehicle system 100A, in a case where it is determined that the behavior of the vehicle V which is the behavior change opposite to the most recent behavior change is performed, the behavior change can be smaller compared to the case where the travelling of the vehicle V is controlled to follow the target control value in the travel plan. Therefore, it is possible to improve the riding comfort in the vehicle V.

The stop detection unit 16 determines whether or not the traffic signal D is the red signal when the vehicle V arrives at the position of the traffic signal D based on the display pattern or the like of the traffic signal D positioned at a predetermined distance from the vehicle V on the target route. In this way, the stop detection unit 16 can detect the stop position while considering the timing of changing the signal indicated by the traffic signal D.

In a case where the behavior determination unit 14A determines that the behavior of the vehicle V which is opposite to the most recent behavior change is performed within the first time from the current time, the travel control unit 15A calculates the instruction control value such that the vehicle state becomes the restricted vehicle state until the travel plan that includes the change of the state of the vehicle V to the deceleration state is newly generated by the travel plan generation unit 13. In this way, the autonomous driving vehicle system 100A can end the calculating of the instruction control value which is an exceptional restricted vehicle state at an appropriate timing. Therefore, it is possible to calculate the instruction control value again such that the vehicle state becomes the target vehicle state.

As described above, the embodiments of the present invention are described. However, the present invention is not limited to the embodiments described above. For example, the control width is not limited to being generated based on at least any of the surrounding information of the vehicle V and the vehicle state. In addition, the control width may be a constant value determined in advance.

In the first embodiment and the second embodiment, the processing of calculating the instruction control value such that the vehicle state of the vehicle V becomes the restricted vehicle state may end according to an ending condition other than the ending condition described above.

What is claimed is:

1. An autonomous driving vehicle system comprising:
   a surrounding information recognition unit configured to recognize surrounding information of a vehicle;
   a travel plan generation unit configured to generate a travel plan along a pre-set target route based on the surrounding information of the vehicle and generate a control width of a target control value of the vehicle in the travel plan;
   a vehicle state recognition unit configured to recognize a vehicle state of the vehicle;
   a calculation unit configured to calculate an instruction control value such that the vehicle state is to become a target vehicle state corresponding to the target control value based on the travel plan, the control width, and the vehicle state;
   an actuator configured to control the vehicle state based on the instruction control value; and
   a behavior determination unit configured to determine whether or not a behavior change which is opposite to a most recent behavior change is performed within a first time from a current time with respect to the most recent behavior change of the vehicle occurs according to the travel plan,
   wherein, in a case where it is determined by the behavior determination unit that the behavior change which is opposite to the most recent behavior change is performed, the calculation unit is configured to calculate the instruction control value such that a behavior change amount of the most recent behavior change is made smaller than in the travel plan and the vehicle state becomes a restricted vehicle state corresponding to a state within the control width compared to a case where the current vehicle state is caused to follow the target vehicle state when it is determined that the behavior change which is opposite to the most recent behavior change is not performed within the first time from the current time with respect to the most recent behavior change of the vehicle according to the travel plan.

2. The autonomous driving vehicle system according to claim 1,
   wherein the travel plan generation unit is configured to generate the travel plan of an interval between the current time and the first time, and
   wherein the behavior determination unit is configured to determine whether or not the opposite behavior change is performed in the travel plan in the interval.

3. The autonomous driving vehicle system according to claim 2,
   wherein, in a case where it is determined by the behavior determination unit that the opposite behavior change is performed, the calculation unit is configured to calculate the instruction control value such that the vehicle state becomes the restricted vehicle state until the vehicle reaches a timing in the travel plan at which the opposite behavior change is performed.

4. The autonomous driving vehicle system according to claim 2, wherein, in a case where it is determined by the behavior determination unit that the opposite behavior change is performed, the calculation unit is configured to calculate the instruction control value such that the vehicle state becomes the restricted vehicle state until the vehicle state coincides with the target vehicle state after the vehicle reaches the timing in the travel plan at which the opposite behavior change is performed.

5. The autonomous driving vehicle system according to claim 1, further comprising:

a stop detection unit configured to detect whether or not there is a stop position on the target route of the vehicle within a predetermined distance from the vehicle, wherein the travel plan generation unit is configured to generate the travel plan for a plan generation time period shorter than the interval between the current time and the first time, wherein the behavior determination unit is configured to determine whether or not the vehicle is in an acceleration state and a deceleration state based on the travel plan for the plan generation time period, and in a case where it is determined that the vehicle is in the acceleration state and is not in the deceleration state within the plan generation time period and in a case where the stop position is detected by the stop detection unit, the behavior determination unit is configured to determine that the opposite behavior change is performed, and wherein, in a case where it is determined by the behavior determination unit that the opposite behavior change is performed, the calculation unit is configured to calculate the instruction control value relating to a speed of the vehicle such that the vehicle state becomes the restricted vehicle state.

6. The autonomous driving vehicle system according to claim 5, wherein the stop detection unit is configured to determine whether or not a traffic signal is a red signal when the vehicle arrives at a position of the traffic signal based on a display pattern of the traffic signal positioned within a predetermined distance from the vehicle on the target route, the speed of the vehicle, and the distance from the vehicle to the traffic signal, and in a case where it is determined that the traffic signal is the red signal, the stop detection unit is configured to determine that there is the stop position within the predetermined distance.

7. The autonomous driving vehicle system according to claim 5, wherein, in a case where it is determined by the behavior determination unit that the opposite behavior change is performed, the calculation unit is configured to calculate the instruction control value such that the vehicle state becomes the restricted vehicle state until the travel plan that includes the change of the state of the vehicle to the deceleration state is newly generated by the travel plan generation unit.

8. The autonomous driving vehicle system according to claim 1, wherein the travel plan generation unit is configured to generate the control width based on at least any of the vehicle state and the surrounding information.

* * * * *